United States Patent [19]
Palazzo

[11] Patent Number: 6,102,241
[45] Date of Patent: Aug. 15, 2000

[54] EXTRUDED POLYMER TANK AND METHOD OF MAKING SAME

[76] Inventor: David T. Palazzo, P.O. Box 290711, Tampa, Fla. 33687

[21] Appl. No.: 09/344,293

[22] Filed: Jun. 26, 1999

Related U.S. Application Data

[60] Continuation-in-part of application No. 09/158,959, Sep. 22, 1998, which is a division of application No. 08/735,610, Oct. 23, 1996, Pat. No. 5,816,435, and a continuation-in-part of application No. 08/867,382, Jun. 2, 1997, Pat. No. 6,026,977, which is a continuation-in-part of application No. 08/735,610.

[51] Int. Cl.[7] ............................................. B65D 6/00
[52] U.S. Cl. ............................................. 220/586; 220/591
[58] Field of Search .................................. 220/586, 587, 220/588, 589, 590, 591, 449, 455, 469, 4.13

[56] References Cited

U.S. PATENT DOCUMENTS

| | | | |
|---|---|---|---|
| Re. 34,203 | 3/1993 | Palazzo | 220/445 |
| 2,814,313 | 11/1957 | Tate | 220/591 X |
| 3,074,584 | 1/1963 | Dobell | 220/586 X |
| 3,616,006 | 10/1971 | Landgraf et al. | 156/188 |
| 3,687,765 | 8/1972 | MacLean et al. | 156/187 |
| 3,802,908 | 4/1974 | Emmons | 117/72 |
| 4,130,453 | 12/1978 | Hollister | 156/187 |
| 4,178,200 | 12/1979 | Hakert | 156/187 |
| 4,523,454 | 6/1985 | Sharp | 73/49.2 |
| 4,596,619 | 6/1986 | Marks | 220/591 X |
| 4,640,439 | 2/1987 | Palazzo | 220/445 |
| 4,644,627 | 2/1987 | Palazzo | 29/423 |
| 4,655,367 | 4/1987 | Palazzo | 220/445 |
| 4,660,738 | 4/1987 | Ives | 220/591 X |
| 4,744,137 | 5/1988 | Palazzo | 26/455 R |
| 4,780,946 | 11/1988 | Palazzo | 29/455.1 |
| 4,780,947 | 11/1988 | Palazzo | 29/455.1 |
| 4,844,287 | 7/1989 | Long | 220/455 X |
| 4,927,050 | 5/1990 | Palazzo | 220/445 |
| 5,439,711 | 8/1995 | Yu et al. | 427/430.1 |
| 5,494,183 | 2/1996 | Sharp | . |
| 5,816,435 | 10/1998 | Palazzo | 220/586 |

*Primary Examiner*—Steven Pollard
*Attorney, Agent, or Firm*—Carlton, Fields et al.

[57] ABSTRACT

A storage tank and method for making it is disclosed in which a first tank portion having a cylindrical sidewall is formed by helically extruding a plurality of partially overlapping layers of synthetic resin on a portion of a cylindrical form, with an end portion being formed and sealingly affixed to the sidewall portion, with the cylindrical form being removed from within the first tank portion, and then any remaining open cylindrical end being closed to form a closed cylindrical tank.

21 Claims, 16 Drawing Sheets

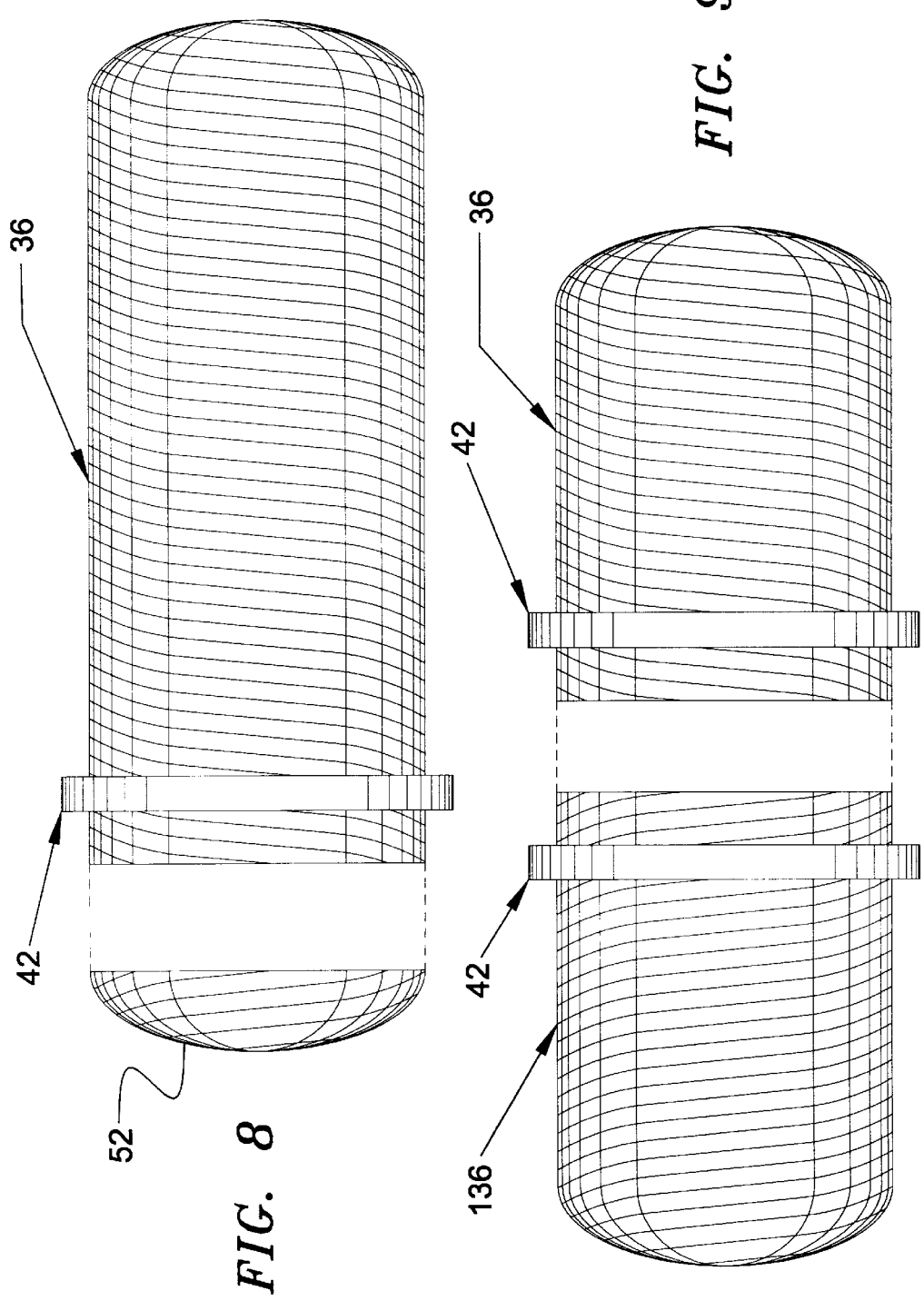

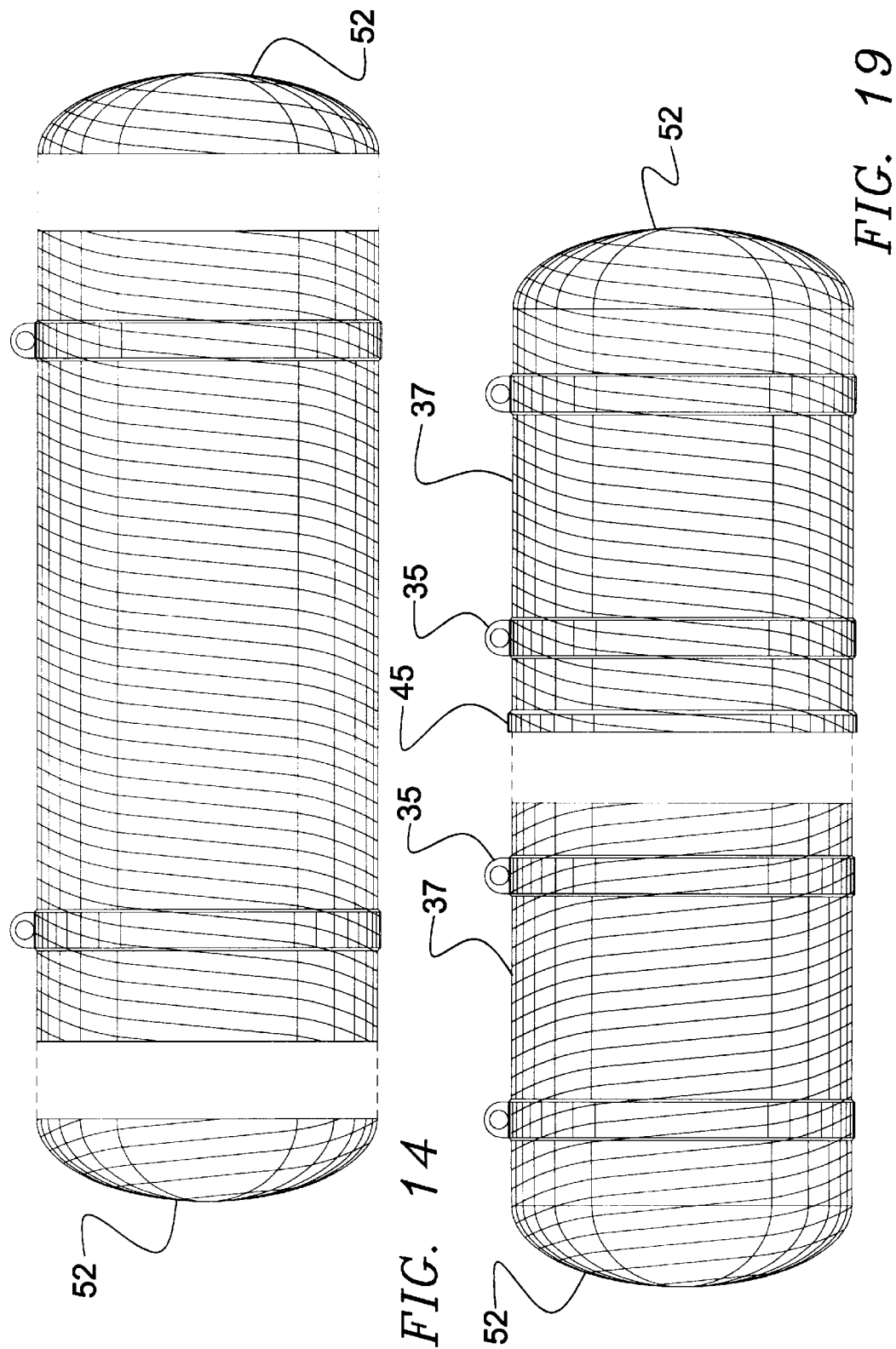

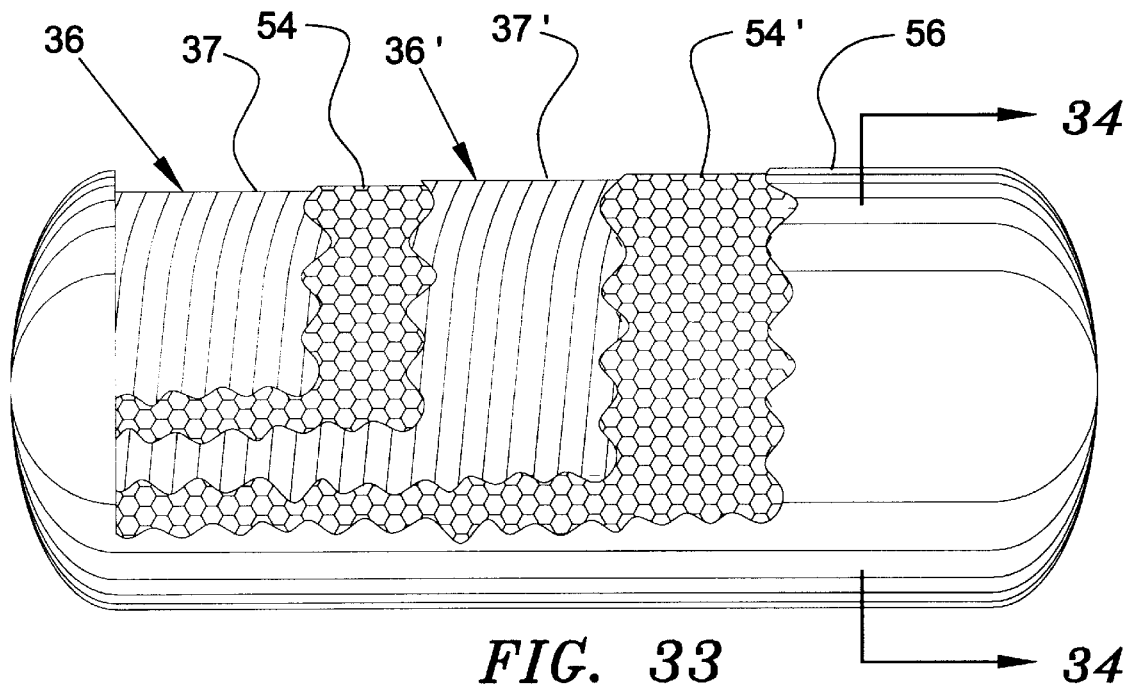
FIG. 33
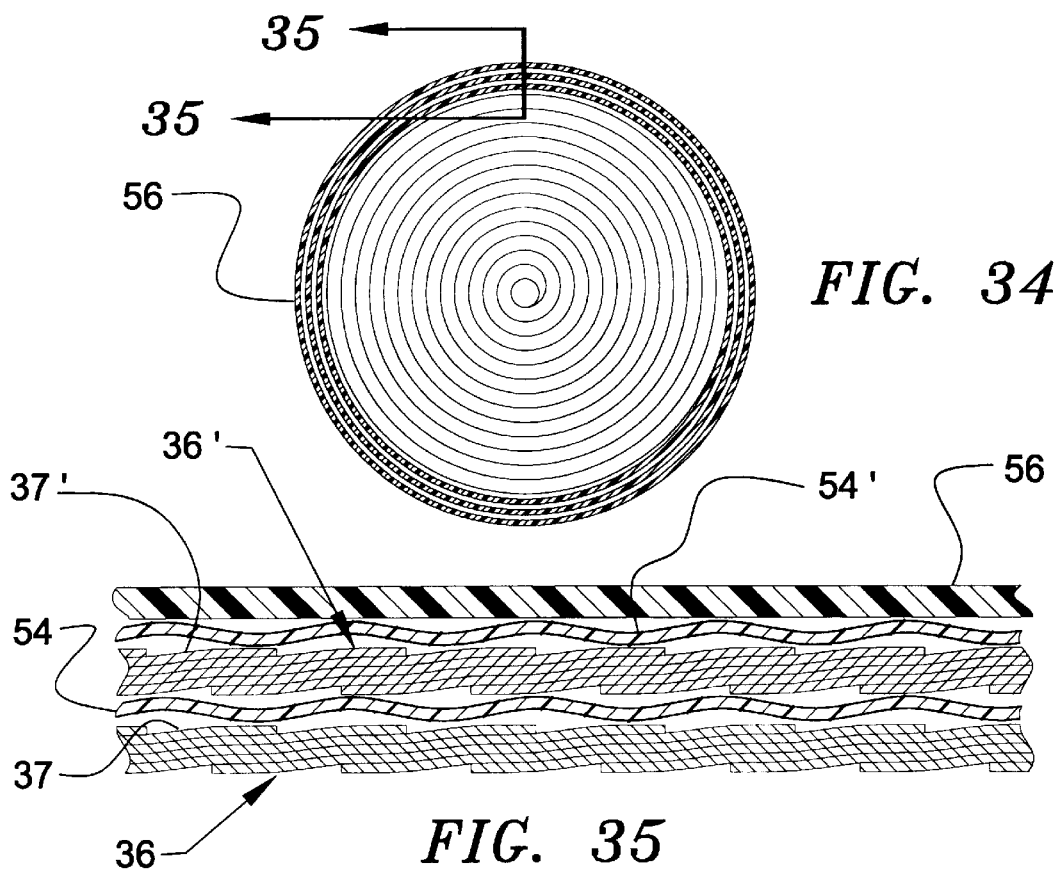
FIG. 34
FIG. 35

EXTRUDED POLYMER TANK AND METHOD OF MAKING SAME

RELATED APPLICATIONS

This is a continuation-in-part of U.S. patent application Ser. No. 09/158,959 entitled "Double Wall Storage Tank Having an Extruded Outer Sheath and a Method for Making Same," filed Sep. 22, 1998, now pending, and which, itself, is a division of U.S. patent application Ser. No. 08/735,610, of the same title and filed Oct. 23, 1996, now U.S. Pat. No. 5,816,435, and this application is also a continuation-in-part of application Ser. No. 08/867,382 entitled "Multiple Wall Storage Tank Having an Extruded Outer Jacket Bonded Around an Aperture and a Method of Making Same, filed Jun. 2, 1997, and now U.S. Pat. No. 6,026,977, which itself is also a continuation-in-part of said application Ser. No. 08/735,610.

BACKGROUND OF THE INVENTION

This invention relates generally to tanks for the storage of liquids, and more particularly to cylindrical tanks fabricated from polymer materials and a method for making same.

Tanks for the storage of liquids have been constructed in a variety of ways from a variety of materials. In one common application, the storage of hydrocarbons, such as gasoline and other petroleum products, the tanks have conventionally been fabricated out of steel or fiberglass, most commonly with a rigid single wall. In many applications this constructions has proved reasonably satisfactory, although the cost of tanks of those constructions has been substantial. Additionally, with increasing age, steel tanks may begin to rust due either to water accumulating on the inside of the tank with the hydrocarbon, or from soil moisture. For these reasons there has been a need for alternative construction of such tanks, whether for hydrocarbons or for the storage of other types of liquids, and whether fabricated of single or multiple wall construction.

Several methods of manufacturing such tanks have been developed, including those disclosed by David T. Palazzo, the inventor of the present invention, in U.S. Pat. No. 4,640,439 and its progeny, and in his U.S. Pat. No. 5,816,435, to which the present invention is related. While the materials and processes disclosed in those prior patents have been satisfactory in many respects, a need has existed for improved efficiency in manufacturing those tanks.

SUMMARY OF THE INVENTION

In view of the foregoing, it is an object of the present invention to provide an economical method of manufacturing a cylindrical tank for the storage of liquids. To achieve this and other objects of the invention that will become readily apparent to those skilled in the art, this invention provides a cylindrical tank and a method of manufacturing such a tank for the storage of liquids, which includes forming a first tank cylindrical sidewall portion having opposed axial ends by helically extruding a first plurality of partially overlapping layers of a molten synthetic resin material over a portion of a cylindrical form, with each successive layer bonding to a portion of each adjacent such overlapping layer along a cylindrical sidewall, forming an end portion for the tank and sealingly affixing the end portion to one of the sidewall portion axial ends to form one closed cylindrical end of the first tank portion. Subsequently, the cylindrical form is removed from within the first tank portion and any remaining open cylindrical end of that first tank portion is closed, whereby is formed a closed cylindrical tank.

BRIEF DESCRIPTION OF THE DRAWINGS

Particularly preferred embodiments of the invention will be described in detail below in connection with the drawings in which:

FIG. 3 is a side elevation of a variation of the process illustrated in FIG. 1, in which two complete layers of polymer material are applied to the cylindrical form, to form a thicker tank;

FIG. 8 is a side elevational view of the application of an end portion of FIG. 7 to a tank first portion;

FIG. 9 is a side elevational view of a method of forming a closed tank by joining together a tank first portion and a tank second portion;

FIG. 14 is a side elevation illustrating the application of two domed end panels to a tank first portion made according to the embodiment of FIG. 12, to form a closed tank;

FIG. 19 illustrates a process of forming a tank according to this invention in which a tank second portion is received within the enlarged shoulder of a tank first portion;

FIG. 33 is a side elevational view, partially in section, of a tank first portion similar to that of FIG. 27, but with a spacing material interposed between each of the layers of extruded polyethylene as well as between the outer layer of polyethylene and the exterior jacket.

FIG. 34 is an end sectional view taken along lines 34—34 of the tank first portion of FIG. 33;

FIG. 35 is a fragmentary sectional view taken along lines 35—35 of FIG. 34 and shown at an enlarged scale;

DETAILED DESCRIPTION OF PREFERRED EMBODIMENTS

Figure 1:
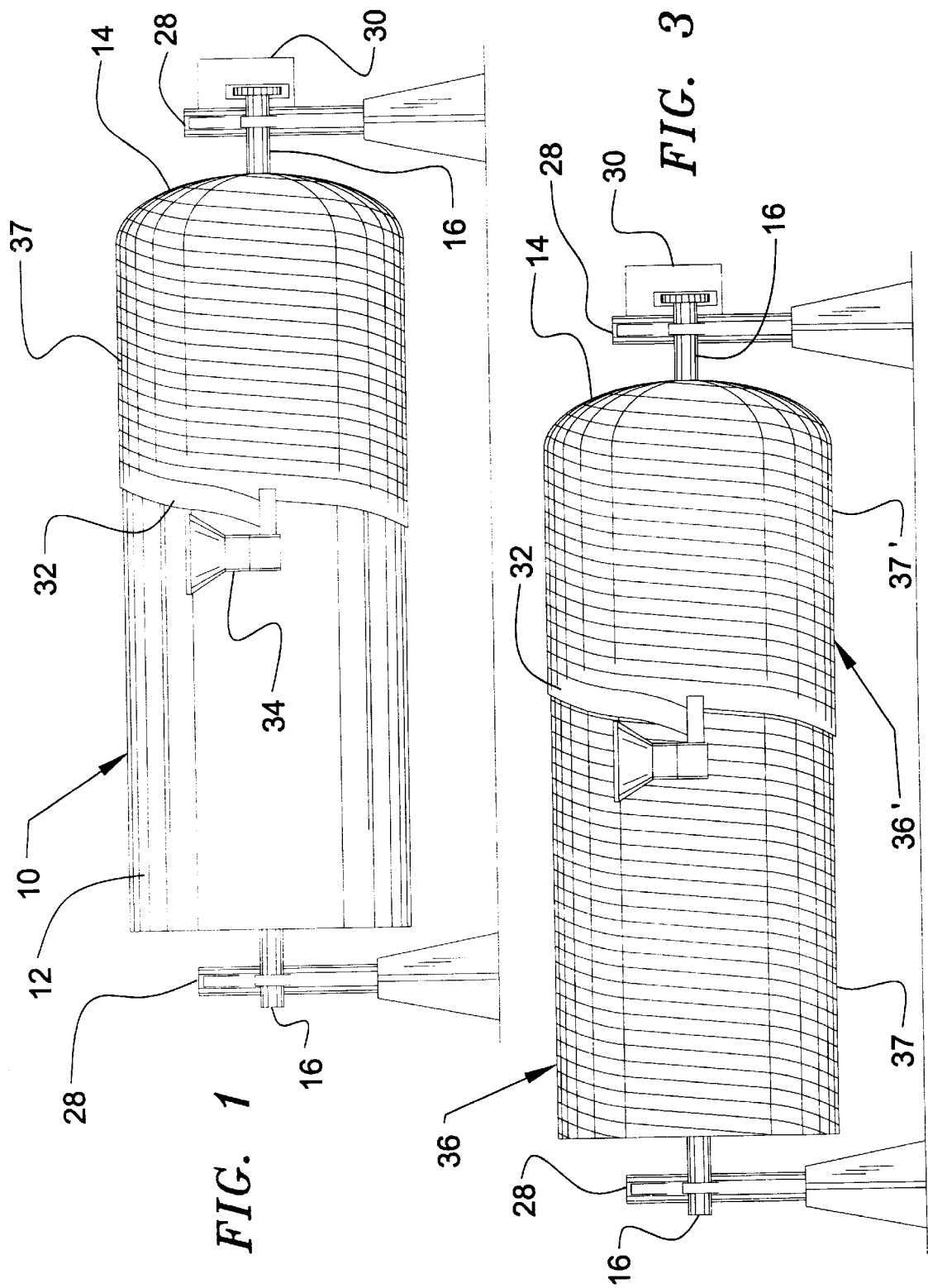
FIG. 1 is a side elevation illustrating the method of fabricating a first tank portion according to one embodiment of the present invention.

Preferred embodiments of the apparatus and method of the present invention are illustrated in FIGS. 1–35, in which similar reference numbers refer to corresponding elements in the various views. FIG. 1 illustrates a portion of the basic procedure for fabricating a cylindrical storage tank according to this invention. Because many elements of this basic procedure are similar to those disclosed in the above-referenced U.S. Pat. No. 5,816,435, the disclosure of that patent is incorporated herein by reference. In this process there is used a generally cylindrical form 10 having a cylindrical sidewall 12 and, for the embodiment of FIG. 1, at least one closed cylindrical end 14.

Figure 4:
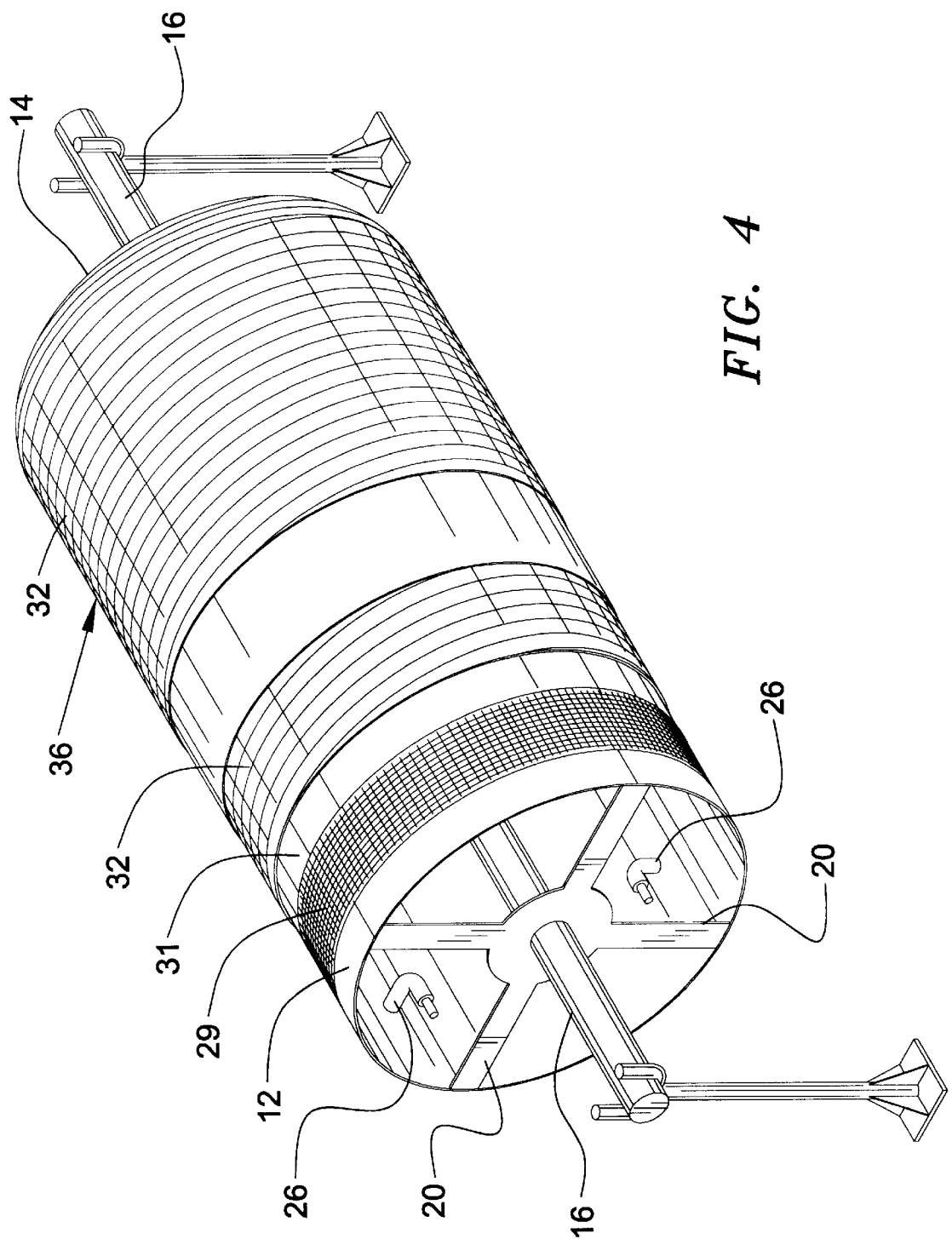
FIG. 4 is an isometric view, partially in section, of a variation in the process of FIG. 3, in which a spacing material is interposed between the two layers of the extruded polymer material.

While this cylindrical form 10 may conveniently be of unitary construction, it may conveniently also be assembled of a plurality of sections that may be joined together to form the cylindrical form, or may be disassembled to facilitate removal of the form from a tank portion. Such a multi-section form is shown schematically in FIG. 2 as having a central spindle 16 extending along the cylindrical axis, suitably with a plurality of support elements 18 mounted on that spindle and having arm portions 20 extending outwardly from that spindle 16. To these outwardly extending portions 20 are releasably attached, by any convenient means, such as bolts, clamps or other well-known structures, a plurality of cylindrical sidewall sectors 22. At one end of the respective sidewall sectors 22 there may be provided for each such sector an end panel 24 extending from the longitudinal edge of the respective sidewall sector into the spindle 16. Thus, when the sidewall sectors 22 and end panels 24 are fully assembled, they form a unitary cylindrical form 10 in the manner indicated in FIG. 4, having one closed end 14 and an opposed open end. As shown in FIG. 4, one or a plurality of pneumatic fittings 26 may be mounted to the sidewall sectors 22 to enable pressurized fluid, such as air, to be introduced through the cylindrical sidewall 12, to effect release of a molded tank portion, in a manner to be described in greater detail below.

Figure 2:
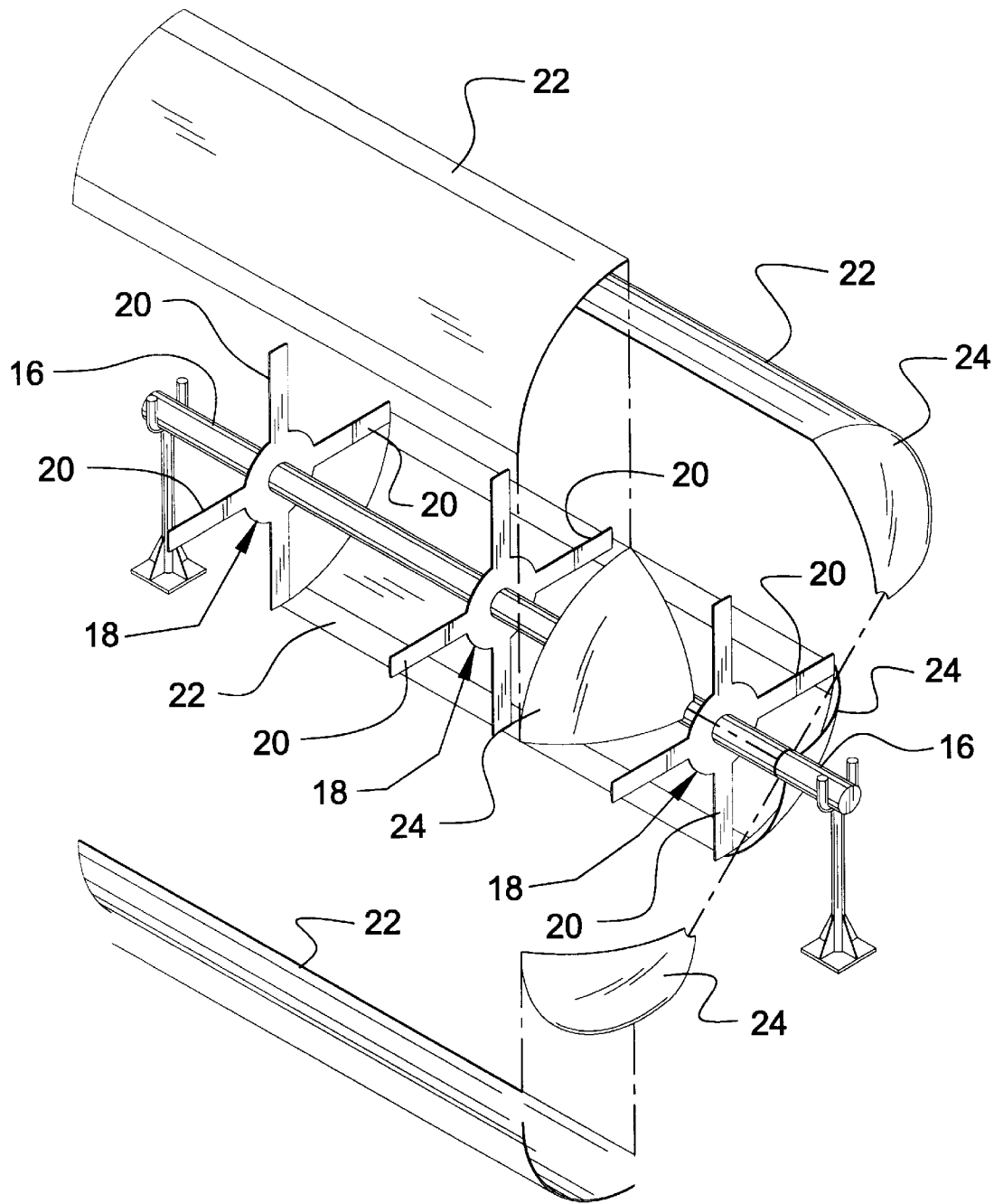
FIG. 2 is an exploded view of one embodiment of a cylindrical form used in connection with the method of claim 1.
Figure 12:
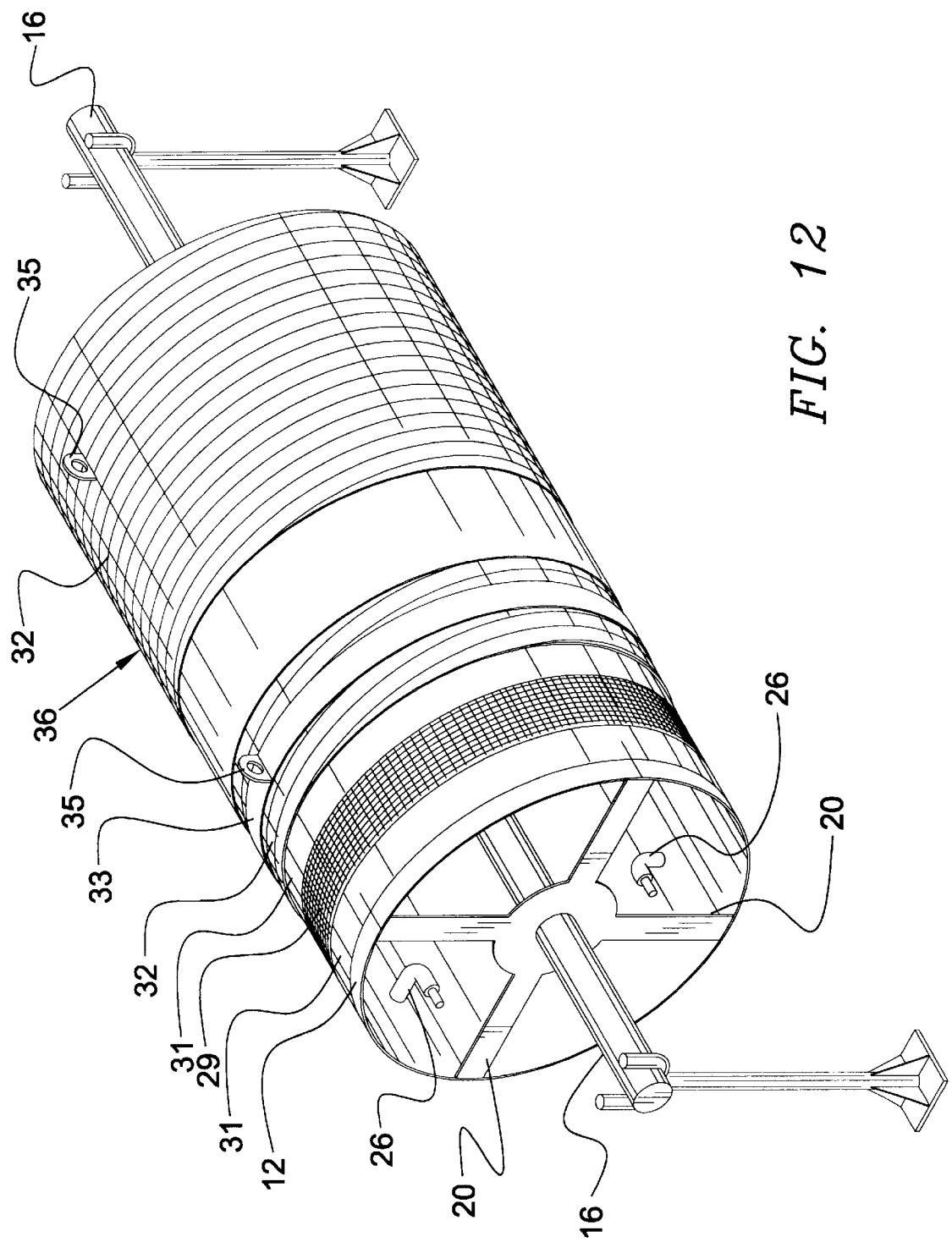
FIG. 12 is a isometric view, partially in section, of a variation of the process of FIGS. 1 through 4 in which the cylindrical sidewall portions of the tank are extruded with open opposed axial ends and with both end portions being formed separately instead of concurrently with extrusion of the tank cylindrical sidewall.

Returning to the embodiment of FIG. 1, and using either a unitary cylindrical form 10 or one assembled from removable components, as described with respect to FIG. 2, the initial procedure used in fabrication of such a tank is generally similar to that set forth in U.S. Pat. No. 5,816,435. Specifically, with the spindle 16 of the cylindrical form 10 rotatably mounted to supports 28, the spindle 16 is rotated in a conventional manner by a suitable and conventional drive motor, schematically illustrated as element 30. With the cylindrical form 10 thus being rotated about the axis defined by the spindle 16, the next step includes helically extruding in situ a tank first portion of a synthetic resin material, such as a thermoplastic resin, a thermosetting resin, a catalyzing resin, or other appropriate synthetic resins, over that cylindrical form. In a preferred embodiment of the present invention, the synthetic resin material comprises a molten thermoplastic resin material, preferably a polyolefin, such as polyethylene, polypropylene, or the like, suitably having a melting temperature in the range from about 150° F. to about 600° F. While not strictly necessary, it is preferred to apply to the exterior surface of the cylindrical form prior to the extruding step a form release material 29 to facilitate subsequent removal of the form from within a molded first tank portion. One suitable form of this release material 29 may comprise a sheet of imperforate material, such as Mylar®. Preferably there may also be applied between the release material and the cylindrical form an insulating material 31, which may conveniently be a thin, non-woven web of glass fiber material. If desired, an additional layer of the release material 29 may be interposed between the insulating material 31 and the cylindrical form, as shown in FIG. 12. As noted above, the form release material and fibrous insulating material may be omitted if desired.

As shown in FIG. 1, the extrusion of this material may suitably begin adjacent the spindle 16 on the closed cylindrical end 14 of the form 10 to form an end portion for the tank. The strips 32 of the extruded thermoplastic material are then applied in a spiral form over that closed end, with each adjacent strip 32 substantially overlapping each previous strip, with the strips then being continued in a helical manner along the cylindrical sidewall of the form, thus sealingly affixing that end portion to the axial end of the sidewall portion. Each of these strips or layers 32, laid down by the extruder 34, are conveniently heated to a molten state to facilitate bonding between the plurality of partially overlapping layers 32, to form a substantially liquid impervious outer wall 37, and thus define a first tank portion having a cylindrical sidewall and at least one substantially closed end.

Preferably each successive overlapping strip 32 of the thermoplastic is extruded such that at least half, and suitably about two-thirds to about four-fifths of the width of each such strip overlaps the preceding strip, as shown in FIGS. 1 and 3 to form one continuous layer, although less overlap may be used if desired.

For a given actual length of cylindrical form 10, it is, of course, possible to fabricate a tank first portion 36 of any desired length up to the full length of the cylindrical form, as shown in FIG. 3. In that illustration, a second layer of overlapping strips 32 of the molten thermoplastic resin is applied directly over the first layer, to form a double layer first tank portion 36', providing a greater thickness and thus greater strength for the first tank portion.

Once the first tank portion, as shown in FIGS. 3 and 4, has been fabricated on the cylindrical form, that cylindrical form is then removed from within that first tank portion 36 to permit completion of fabrication of the tank. Where a multi-sector form, such as shown in FIG. 2, has been used, that form may be disassembled from within the molded first tank portion and removed in a conventional manner. Such removal is facilitated with the provision of the form release material, if such is used. If desired, a pressurized fluid, suitably a gas such as compressed air, may be introduced through the fittings 26, which extend through the cylindrical form sidewall, and through the end wall, if desired. This compressed fluid then serves to space at least a substantial part of the first tank portion away from the cylindrical form, suitably stretching the tank slightly to facilitate removal of the form from within, either by disassembly or by simply sliding out the unitary form.

Figure 5:
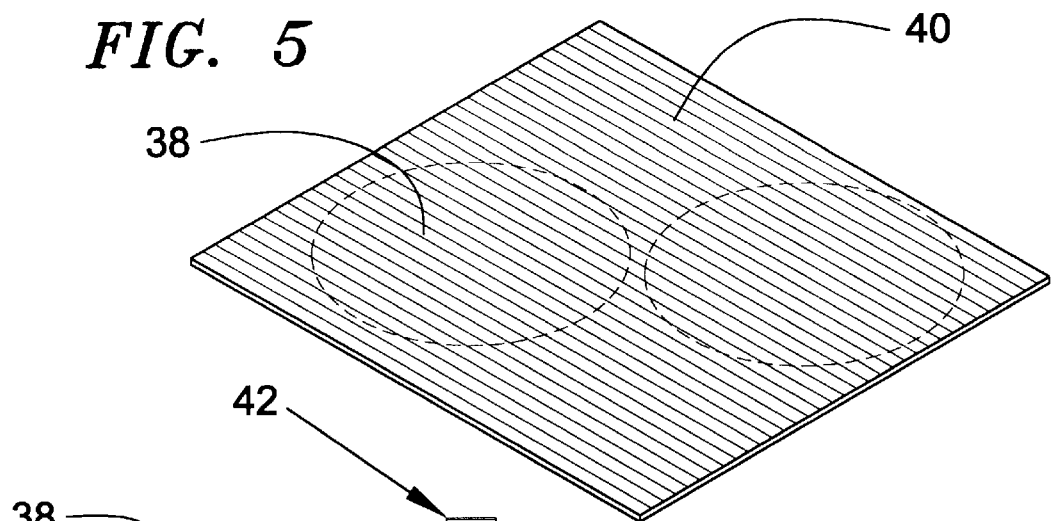
FIG. 5 is a perspective view illustrating one method of obtaining substantially flat end panels for closing an open end of a cylindrical tank portion made according to the present invention.
Figure 6:
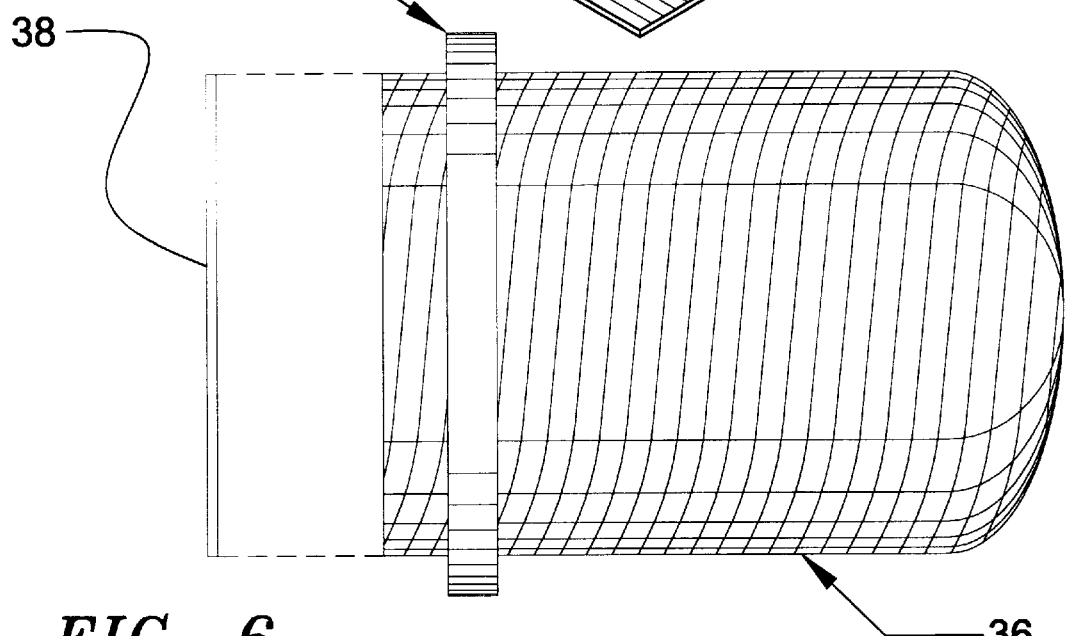
FIG. 6 is a side elevation illustrating the application of an end panel according to FIG. 5 to a tank first portion to form a closed tank.
Figure 10:
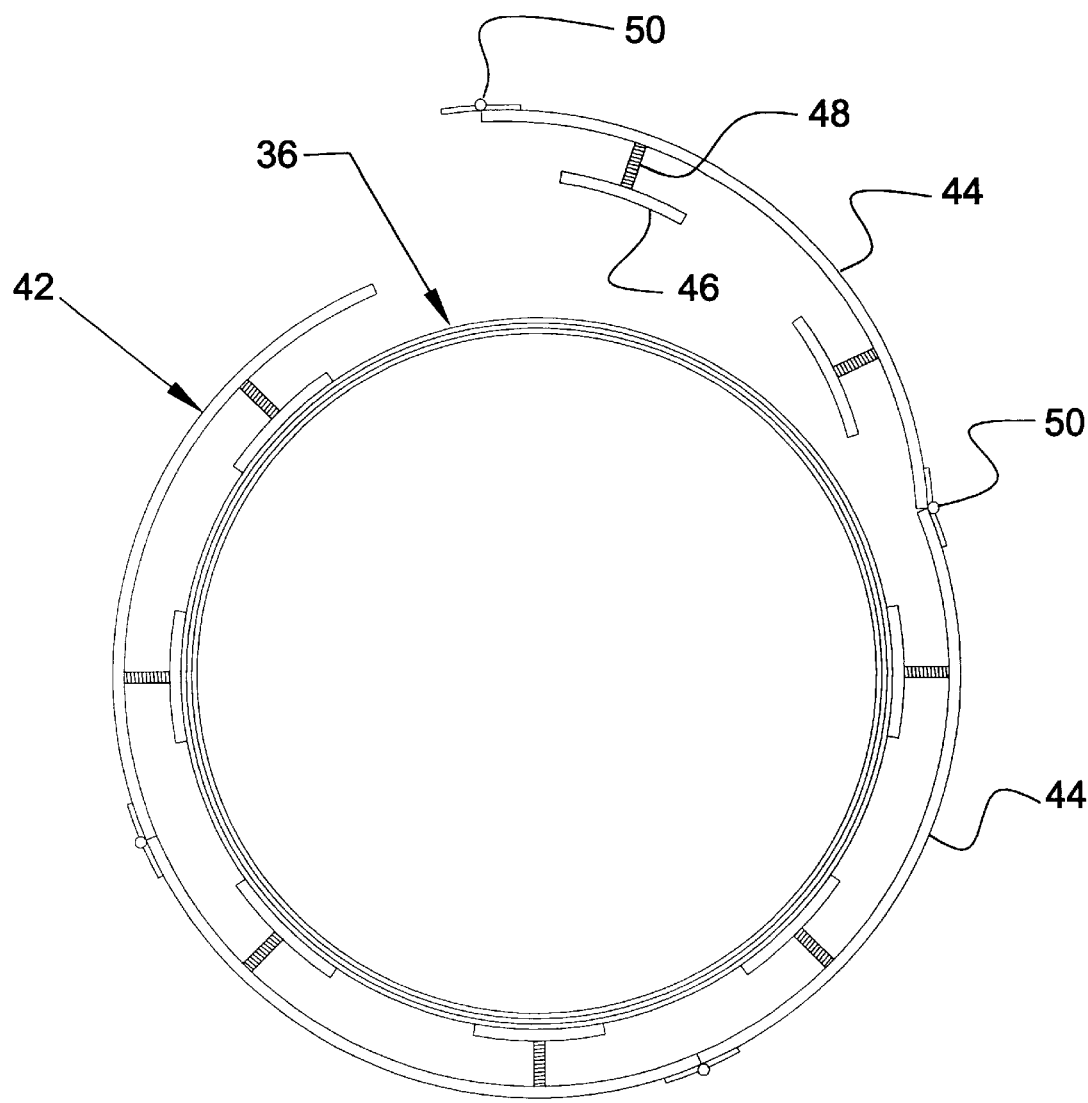
FIG. 10 is an end elevation and FIG. 11 is a side elevation of one embodiment of a support ring for maintaining the circular configuration of a tank portion fabricated according to the method of the present invention, after the cylindrical form is removed.
Figure 11:
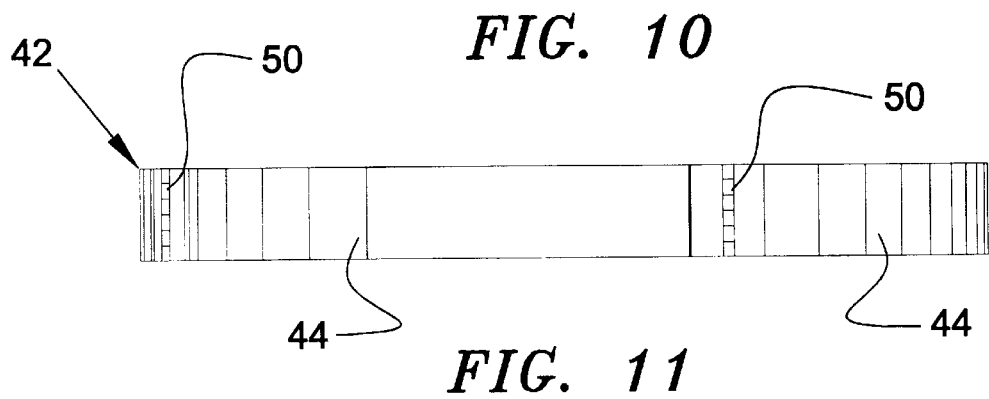

Once the cylindrical form has been removed from the first tank portion, that tank portion is in the form of a cylindrical sidewall with one substantially closed end, and generally with one open end. At the substantially closed end, there may be a small aperture, through which the spindle 16 extended, which may then be sealed, conveniently by welding or bonding a plate of polyethylene in place to complete the closure of that end. To form the finished enclosed cylindrical tank, it is then necessary to close any remaining open cylindrical end of that first tank portion. That open end may be closed in any of a variety of ways, several of which are illustrated in FIGS. 5–9. As shown in FIGS. 5 and 6, a generally flat, cylindrical end panel may be cut from a suitable sheet of material, preferably a polyolefin of the same general composition as the extruded first tank portion. Then, as shown in FIG. 6, that generally disk-like end portion 38 may be fitted over the open end of the tank first portion 36 and secured by conventional means, either adhesive or suitably by welding, to form a liquid-tight seal between the end panel 38 and the tank first portion 36. To maintain the circular configuration of the tank first portion 36, and prevent it sagging under its own weight, a removable support 42 may be mounted to the tank first portion 36 at a location generally proximal the open end and distal the substantially closed end to maintain the predetermined shape of the tank. One embodiment of the removable support 42 is shown in FIGS. 10 and 11 and may comprise a plurality of ring sectors 44, to which are adjustably mounted support pads 46, which may be adjusted inwardly or outwardly by a conventional adjustment mechanism 48, which may conveniently be a threaded member. The ring segments 44 may conveniently be joined by releasably attachable hinge structures 50, generally in the manner shown in FIG. 10, thus facilitating the removable mounting of the support ring around the exterior surface of the tank first portion.

Figure 7:
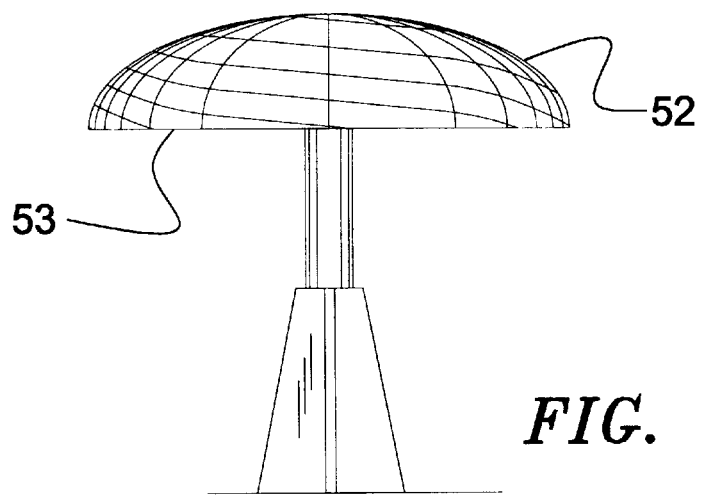
FIG. 7 is a side elevation of an alternative method of forming a tank end portion of domed configuration.

An alternative end closure structure is illustrated in FIGS. 7 and 8. In this embodiment a domed end portion 52 may suitably be extruded over a corresponding mandrel 53, generally in the same manner used for forming the tank closed end portion. Then, when that domed end portion 52 is completed, it may be joined, such as by welding or other conventional means, to the open end portion of the tank first portion 36, as shown in FIG. 8, to provide a completed and closed tank.

Yet another completion technique is illustrated in FIG. 9 in which a second tank portion 136 is formed in substantially the same manner as the first tank portion, with the cylindrical form subsequently removed from within that second tank portion. Then, the closing step comprises joining the first tank portion 36 to the second tank portion 136, in the conventional manner, such as by adhesives or by welding, so that the one substantially closed end on each of the respective first and second tank portions comprises the respective opposed substantially closed end portions of the completed tank. Then, with any remaining openings in the tank correspondingly closed in a sealing manner, there is provided a fully closed tank. As shown in FIG. 9, the removable supports 42, described above, may be used in this embodiment of the process as well.

Figure 13:
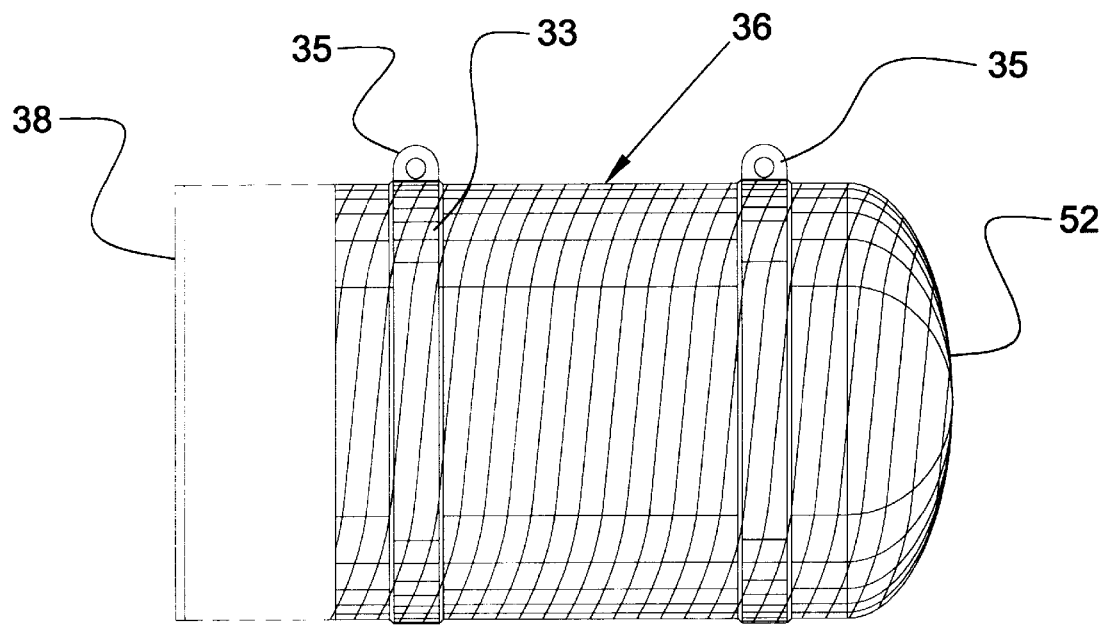
FIG. 13 is a side elevation illustrating the application of two different types of end portions to a tank first portion of FIG. 12 to form a closed tank.
Figure 20:
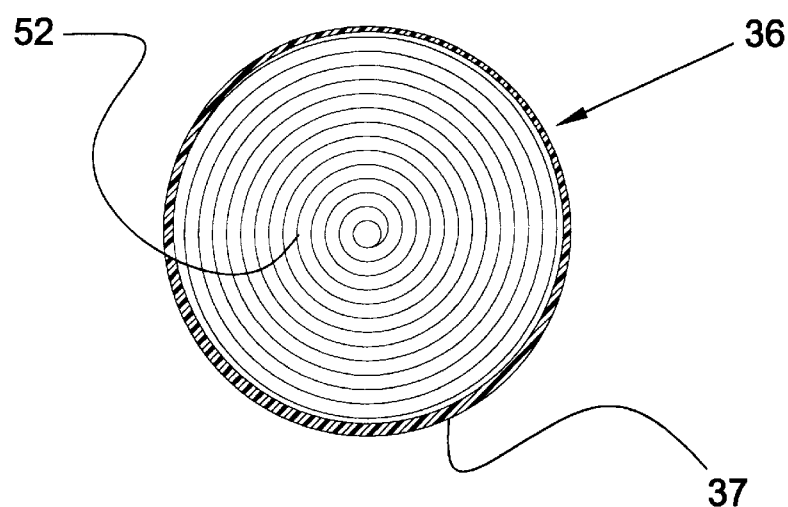
FIG. 20 is a sectional view taken through a tank formed in a process in which the speed of rotation is varied periodically to provide thicker wall portions in one section of the tank than in other sections.

FIGS. 12, 13 and 14 illustrate variations on the fabrication processes illustrated in FIGS. 1, 3 and 4, but with the cylindrical sidewall portion of the tank being extruded with open, opposed axial ends, with both end portions being formed separately, instead of having one formed concurrently with the extrusion of the tank cylindrical sidewall. In FIG. 12 the components corresponding to those components in FIG. 4 are given the same reference numbers for clarity of illustration.

In the embodiment of FIG. 12, after the first set of overlapping layers or strips of the extruded material 32 have been applied, reinforcing material suitably in the form of a strap or circumferential ring 33 may be mounted over that first set of strips of the extruded material 32. Conveniently, this strap or ring 33 may be of a strong and rigid material, such as steel or other metal, or a strong synthetic material, such as a resin-impregnated fabric or fibrous material, and preferably has attached to it a lifting eye 35. Preferably, a plurality of such straps or rings 33 are so applied. Then, after the second set of overlapping layers or strips of the extruded material 32 are applied over that strap 33, that strap is thus bonded into the tank sidewall portion, with the lifting lug 35 projecting through that sidewall portion. In addition to reinforcing and providing for lifting of the tank, the strap 33 and lifting lug 35 may also serve in place of the removable support 42 of FIGS. 10 and 11 to maintain the shape of the sidewall portion when it is removed from the cylindrical form. End portions, conveniently similar to those illustrated in FIGS. 5 through 7, may then be sealingly affixed to the opposed axial ends of the tank, as shown in FIG. 13, thus closing the open cylindrical ends of the tank portion to form a closed cylindrical tank. While FIG. 13 illustrates the use of a domed end portion 52 on one end, and a flat end portion 38 on the opposite end, it is to be understood that a pair of domed end portions, as shown in FIG. 14, or a pair of flat end portions could be used with equal facility.

Figure 15:
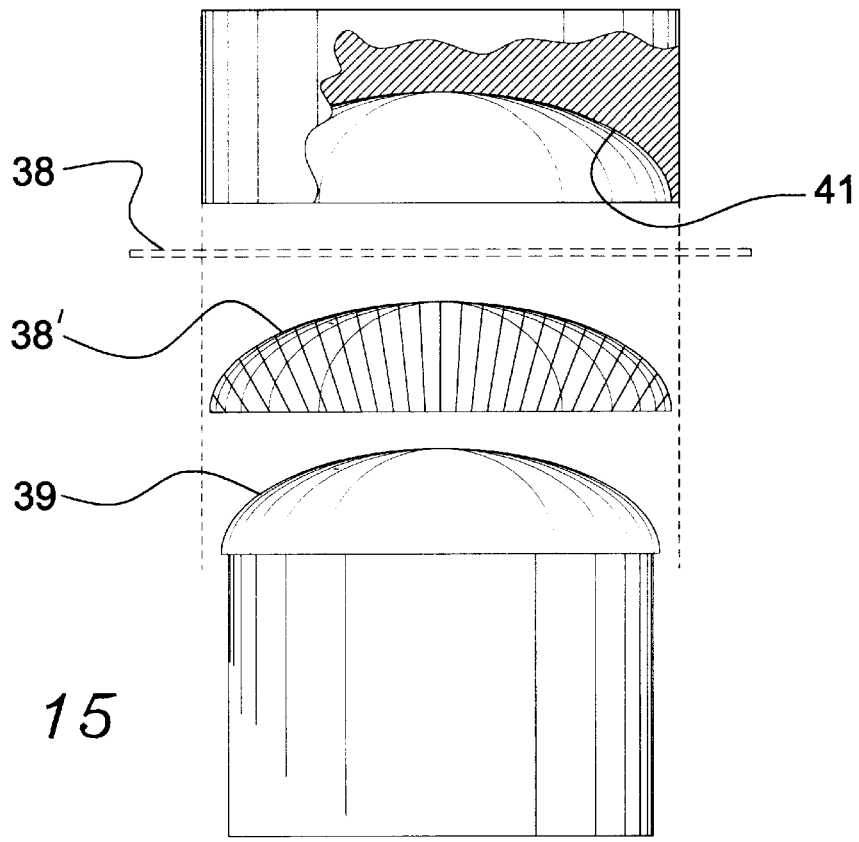
FIG. 15 illustrates a domed press molding process to form domed end portions out of the flat disks illustrated in the embodiment of FIG. 5.
Figure 16:
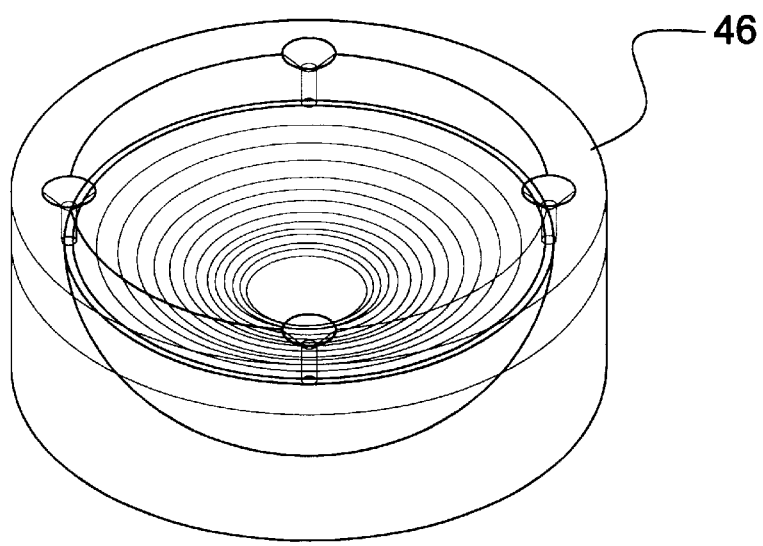
FIG. 16 illustrates a rotary molding apparatus for molding domed end portions for application to tank first portions.

It is also to be understood that the flat end portion 38 shown in FIGS. 5 and 6 may be heat formed, as by a domed, heated press as shown in FIG. 15, having a male portion 39 and a female portion 41, to heat form a domed end portion 38'. Alternatively, if desired, a domed end portion could also be formed by the use of a rotary mold 49 or of other well-known molding techniques, such as is illustrated in FIG. 16.

Figure 17:
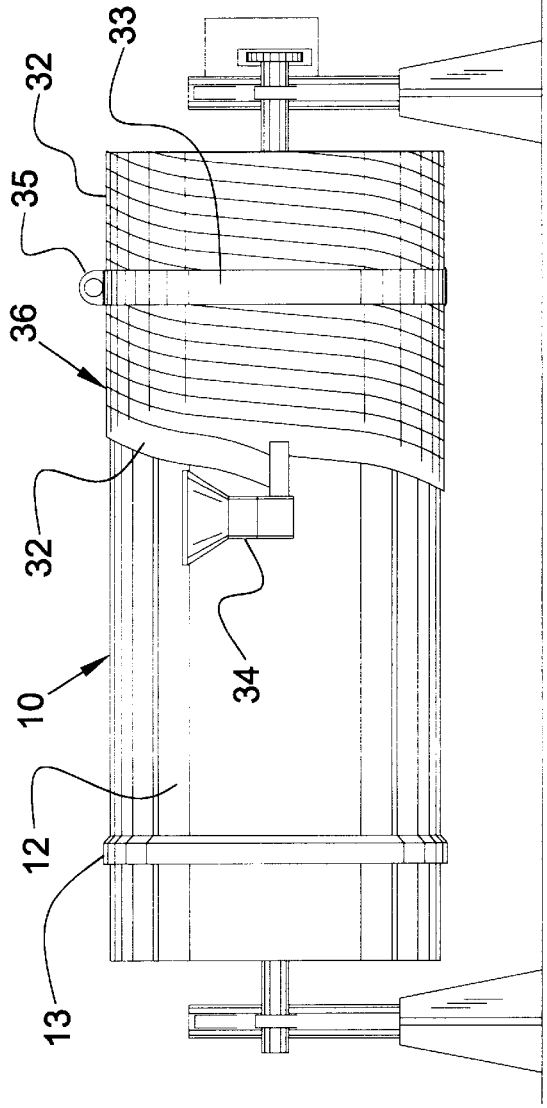
FIGS. 17 and 18 illustrate a process for forming a tank first portion having an enlarged circumferential shoulder for use in forming a tank in the manner illustrated in FIG. 19.
Figure 18:
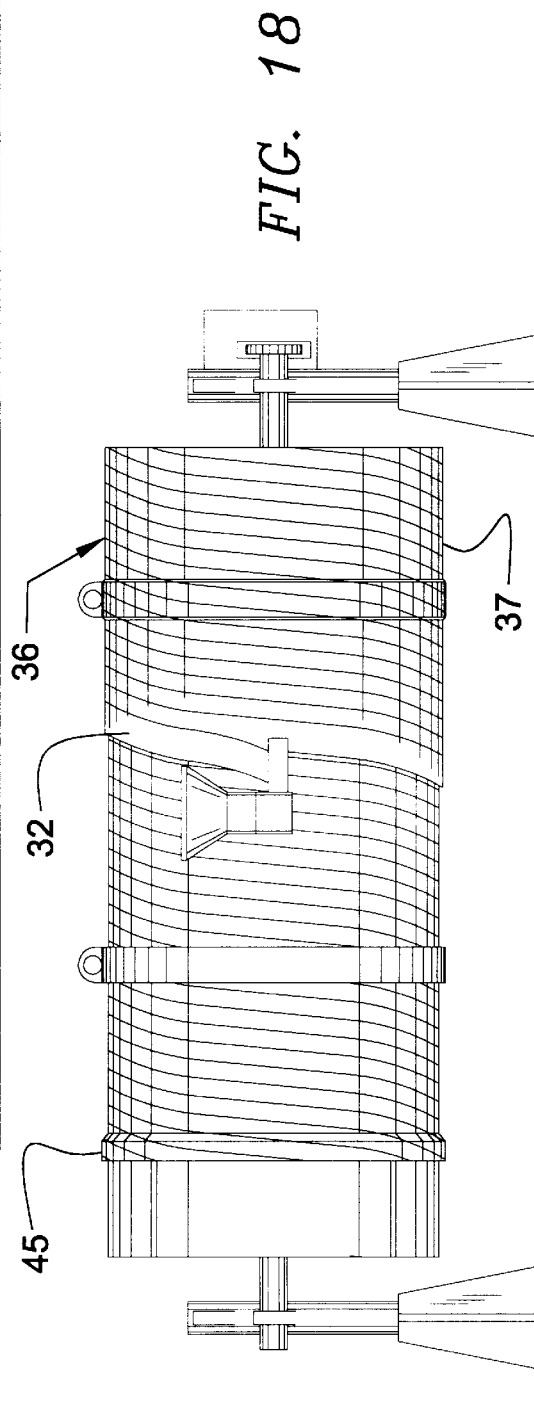

While the embodiments illustrated above enable the fabrication of a tank having a length up to the length of the cylindrical form 12, FIGS. 17 and 18 illustrate a method of fabricating tank sections that may be joined together to form any desired length or volume of tank. In this embodiment the cylindrical sidewall 12 of the cylindrical form 10 includes an enlarged shoulder 13, which may conveniently be formed of a ring mounted over the cylindrical sidewall 12 of the form. Preferably, the diameter of the shoulder or ring 13 is slightly greater than the outside diameter of the cylindrical sidewall portion 36 of the first tank portion. In the manner shown in FIG. 18, the molten synthetic resin strips 32 are extruded continuously along the sidewall of the form and over that shoulder 13. In this manner, the inner diameter of the portion overlying the shoulder 13 is slightly greater than the diameter of the outer wall 36.

As shown in FIG. 19, where at least one tank portion is provided with such an enlarged diameter shoulder 45, a second tank portion may be received inside that shoulder, with the two tank portions then suitably being sealingly joined, as by welding or chemical bonding or other known techniques, to form a tank having a length considerably greater or even several times longer than the cylindrical sidewall of the form 10. Thus, by selecting the appropriate length, tanks of any desired volume may be fabricated from a single cylindrical form.

While it may be conventional to rotate the form at a substantially constant speed to apply a generally uniform thickness of the extruded molten resin to all portions of the cylindrical sidewall, it is to be understood that, if desired, the speed of rotation could be varied, such as in a periodic manner. If the speed of rotation is slowed during a predetermined portion of each rotation, the extruding process may apply a thicker layer of resin to those portions adjacent the extruder during that slowed portion of rotation. In this manner, a tank could be formed having a thicker bottom portion to provide added support, in the manner generally illustrated in the sectional view of FIG. 20. Of course, any other desired variation and thickness could also be obtained through corresponding changes.

Figure 21:
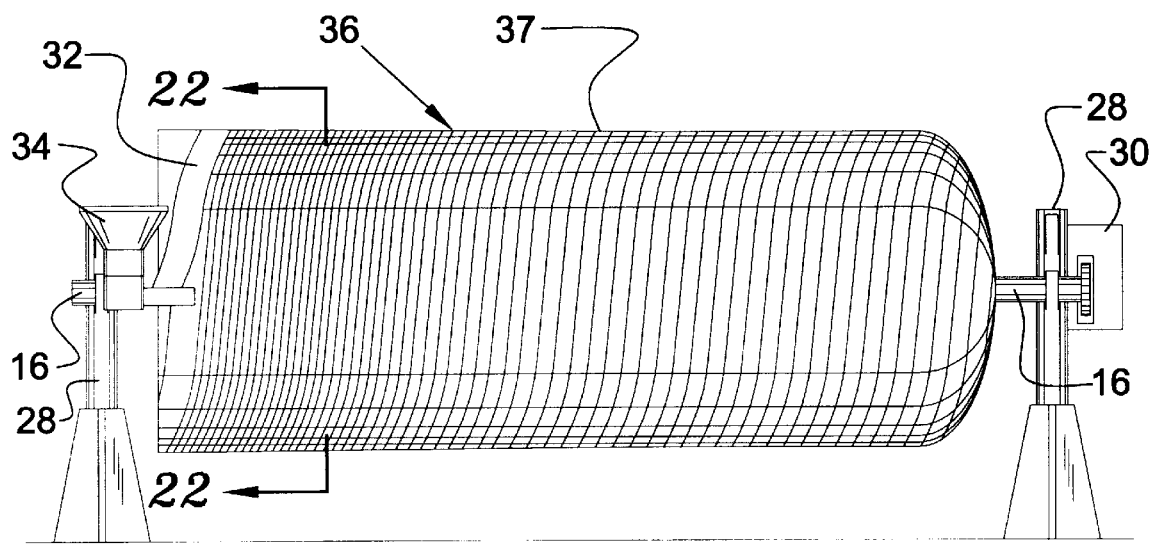
FIG. 21 is a side elevation illustrating a process of forming a tank in which the translational speed of movement of the extruder is varied to change the wall thickness in certain portions of the tank.
Figure 22:
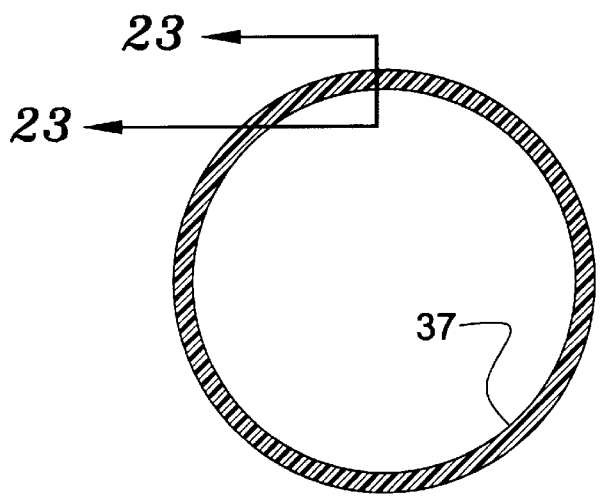
FIG. 22 is a sectional view taken along lines 22—22 of FIG. 21.
Figure 23:
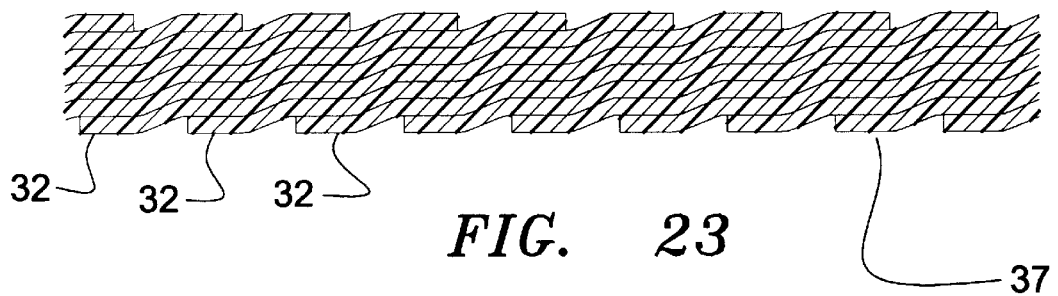
FIG. 23 is a sectional view taken along lines 23—23 of FIG. 22.

FIGS. 21 through 23 illustrate another technique for varying the thickness of the extruded resin over certain portions of the tank. While the other embodiments illustrated in other figures employ an extruder having a substantially constant speed of translational movement of the extruder along the cylindrical form sidewall, in the embodiments of FIGS. 21 through 23 the speed of the extruder translational movement is varied, thus varying the amount of overlap of adjacent partially overlapping layers of the synthetic resin. This has the effect of varying the thickness of the tank cylindrical sidewall portion. By slowing the translational speed of the extruder 34 adjacent one end of the tank, the left-hand end in FIG. 21, there is greater overlap of adjacent layers of the synthetic resin, thus increasing the buildup and the thickness of the portion of the cylindrical sidewall 37 adjacent that left end. In this manner, if the completed tank is used in an orientation with the cylindrical axis vertical, and the left-hand end of the tank in FIG. 21 downward, the resulting base of the tank will be thicker and thus stronger than if the overlap had been maintained constant, as by constant translational speed of the extruder 34. The sectional views of FIGS. 22 and 23 illustrate this greater buildup of the resin layers.

Figure 24:
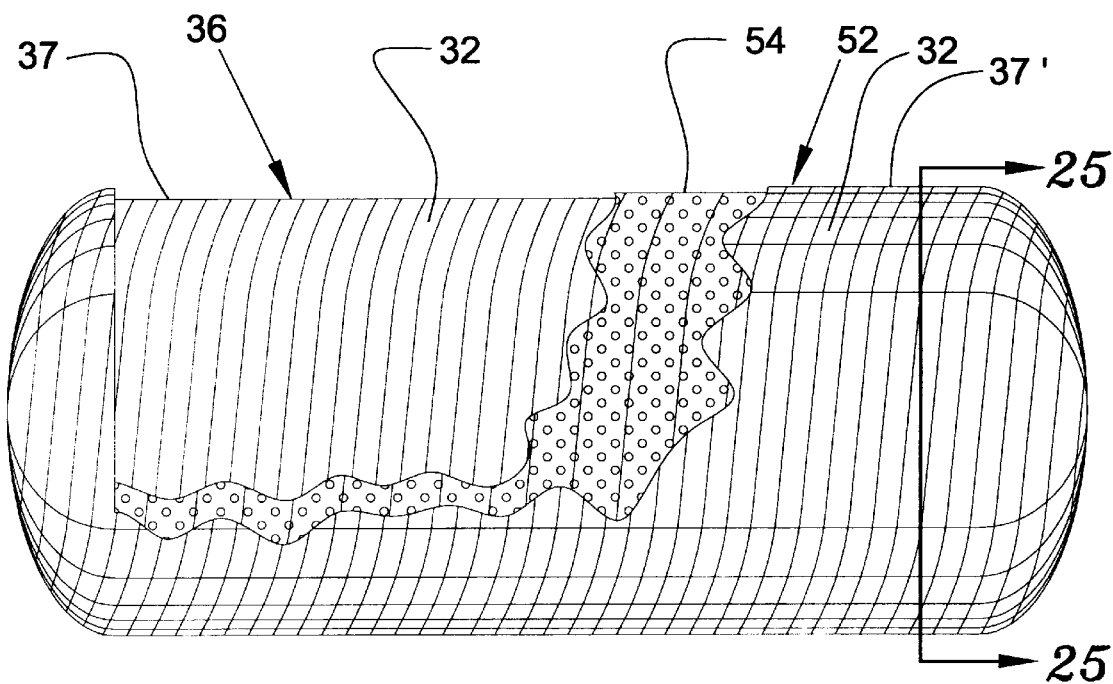
FIG. 24 is a side elevation, partially in section, of a double wall tank first portion fabricated according to another embodiment of the present invention, in which a spacing material is interposed between the overlying layers of extruded polymer.
Figure 25:
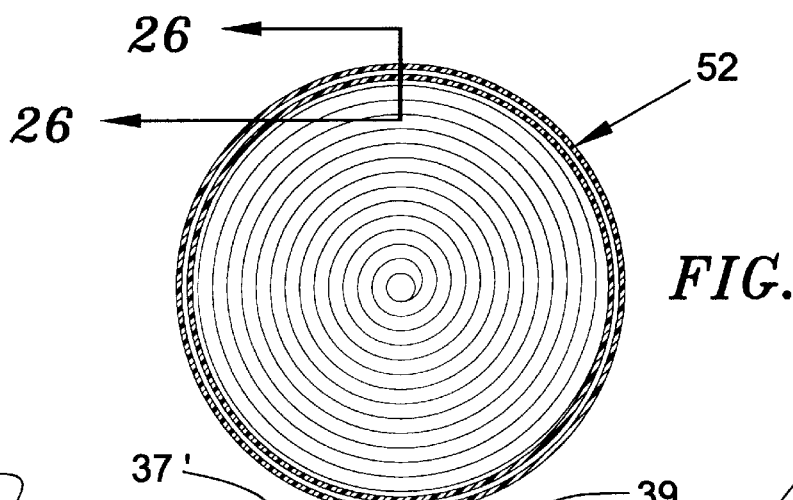
FIG. 25 is an end sectional view of the tank first portion of FIG. 24, taken along line 25—25 of FIG. 24.
Figure 26:
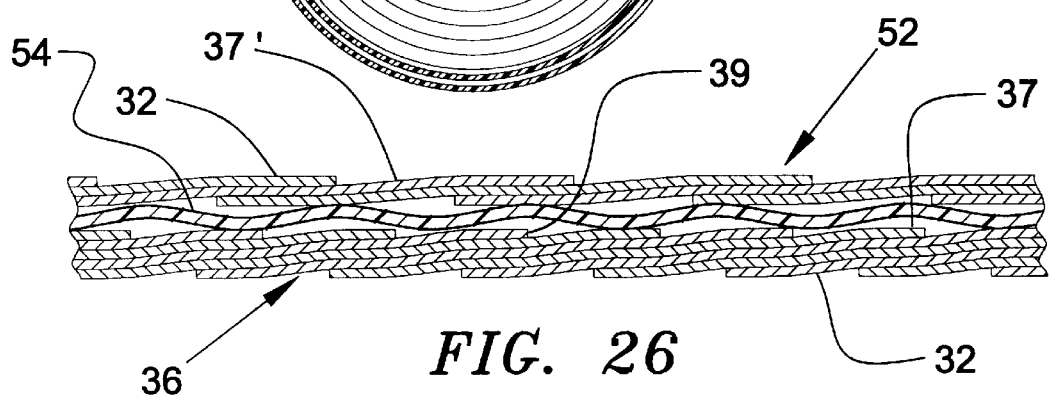
FIG. 26 is a fragmentary sectional view, on an enlarged scale, taken along lines 26—26 of FIG. 25.

FIGS. 24 through 26 illustrate an additional embodiment of the present invention in which the process is used for fabricating a double wall tank first portion 36 in which a first set of overlapping layers or strips of the extruded material 32 are then covered by a release material, such as an imperforate sheet 54, with a second layer of strips 32 of the extruded thermoplastic resin then being applied to form an outer sheath, 52, as shown in FIG. 24. The release material 54 may be any of a number of suitable materials, and preferably may be formed of Mylar®, which has a melting temperature greater than the temperature of the molten thermoplastic material during the step of extruding. The release material 54 may either be a single broad sheet wrapped around the tank first portion 36, or may comprise a helically wrapped plurality of partially overlapping layers of such an elongated sheet of the imperforate material, which may, if desired, have a wavy or dimpled surface. This release material 54 thus serves to space the outer sheath 52 from the underlying tank first portion 36, which prevents bonding between at least a substantial portion of the inner tank first portion 36 and the outer sheath 52 and provides for substantially free passage of liquids between a substantial portion of that inner tank 36 and the outer sheath 52.

As best shown in the sectional view of FIG. 26 (and in FIGS. 29, 32 and 35 of subsequent embodiments) the plurality of partially overlapping layers 32 form a corrugated outer surface 37 on the inner tank 36, defined by at least one ridge 39 extruded and extending helically on the cylindrical sidewall and extending radially outwardly of the remainder of the cylindrical side wall. A portion of the corrugated inner surface of the outer sheath 52, either with or without the spacing material 54 may engage the inner tank exterior surface, possessing such ridge 39, allowing for flow of liquids in the interstitial space defined by the channels caused by the corrugation by the overlapping layers of the extruded material.

The release material 54 may conveniently comprise of any material that may prevent the bonding between the exterior surface of the inner tank first portion 36 and the outer sheath 52 and provide for substantially free passage of liquids along a substantial portion of the exterior surface of that inner tank first portion 36. Appropriate selection of release material 54 may also provide for bonding to the extruded layers of the outer sheath 52 and thereby substantially reduce any sagging of the outer sheath as applied. Suitable examples of release material 54 include, without limitation, conventional liquid mold release agents, silicone polyvinyl acetate (PVA), polyolefins in the form of mesh, nets or films, or powders or oxidation products, wax and grease, as well as other release materials known in the art. The appropriate release material 54 used typically will depend upon the material selected for the outer sheath 52. For example, where the outer sheath 52 is extruded as molten thermoplastic material, such as polyethylene, a preferred embodiment of release material 54 may include applying a relatively thin sheet of an imperforate material, suitably having a generally smooth surface over the exterior surface of the inner tank first portion 36. This release material may, for example, be formed of an elongated sheet or film of a polyester resin material such as Mylar®. If the sheet of the release material 54 is of sufficient size, it may be wrapped as a single unit around the inner tank first portion 36. Alternatively, an elongated sheet of such release material may be spirally wrapped around the exterior surface of the tank first portion 36 as the tank is rotated about its axis. This may occur before or during the extrusion of the outer sheath 52.

Figure 27:
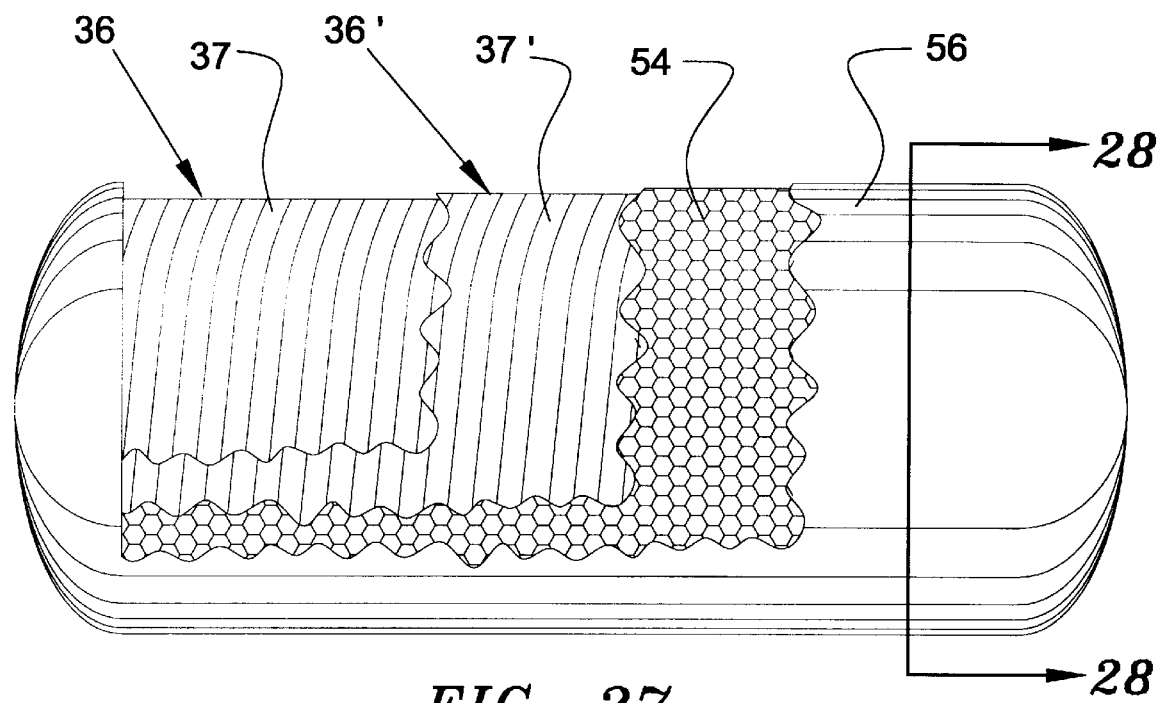
FIG. 27 is a side elevational view, partially in section, of a tank first portion fabricated according to another embodiment of the present invention, incorporating a double layer of extruded polymer, over which is applied a spacing material and then an outer jacket.
Figure 28:
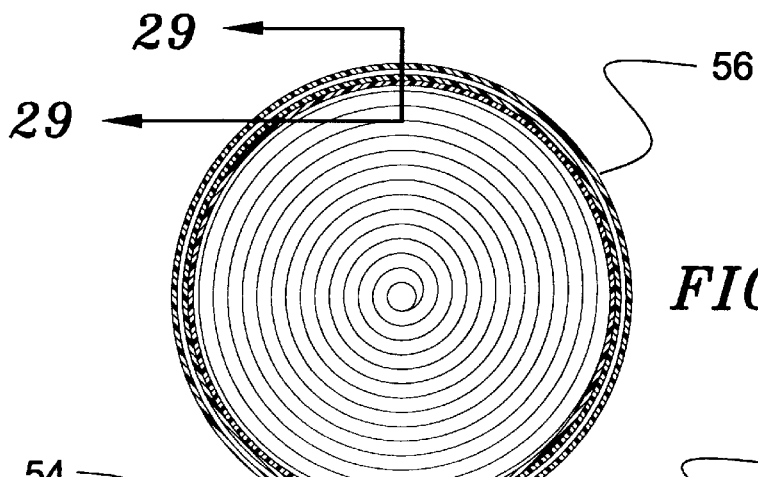
FIG. 28 is an end sectional view of the tank first portion of FIG. 27, taken along line 28—28 of FIG. 27.
Figure 29:
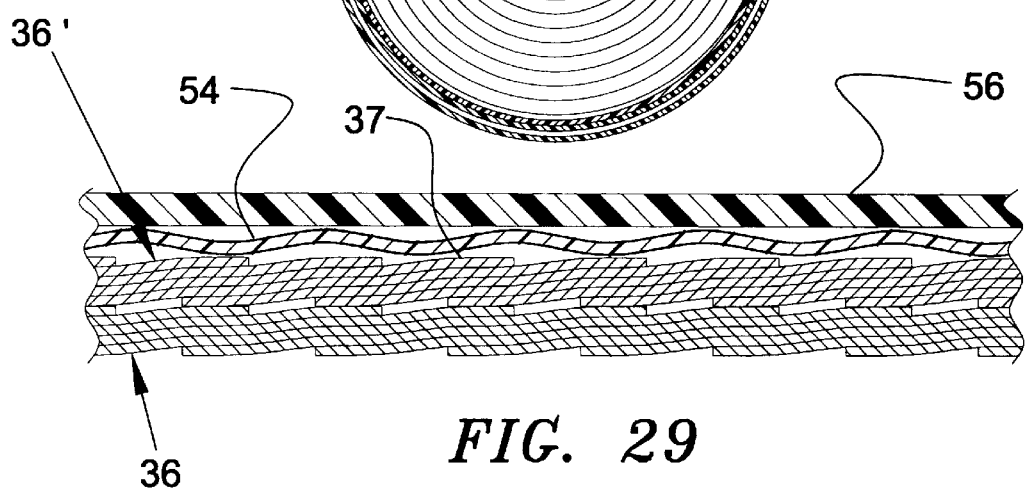
FIG. 29 is a fragmentary sectional view, on an enlarged scale taken along line 29—29 of FIG. 28.

FIGS. 27 through 29 illustrate yet another embodiment of a spaced, double wall tank incorporating the teachings of this invention in which the tank first portion is formed of a double layer construction, as described above in connection with FIG. 3. As shown, the tank first portion is comprised of two layers 36 and 36' of the extruded overlapping strips of the polymer, with the outer layer 36' defining the outer surface 37 of that tank first portion. Over that outer surface 37 of the tank first portion is applied a release material 54, also as described above, and which may be either an imperforate sheet, a mesh or other previously described types of structures. Over the release material, which also serves as a spacing material, is applied an outer sheath. If desired, instead of the extruded outer sheath described above with respect to FIGS. 12 through 14, the outer sheath may be formed of at least one layer of a fibrous material, conveniently fiberglass, coated with a curable resin. Thus, upon curing, there is provided a coating or outer sheath that is resistant to the passage of water or hydrocarbon liquids.

Figure 30:
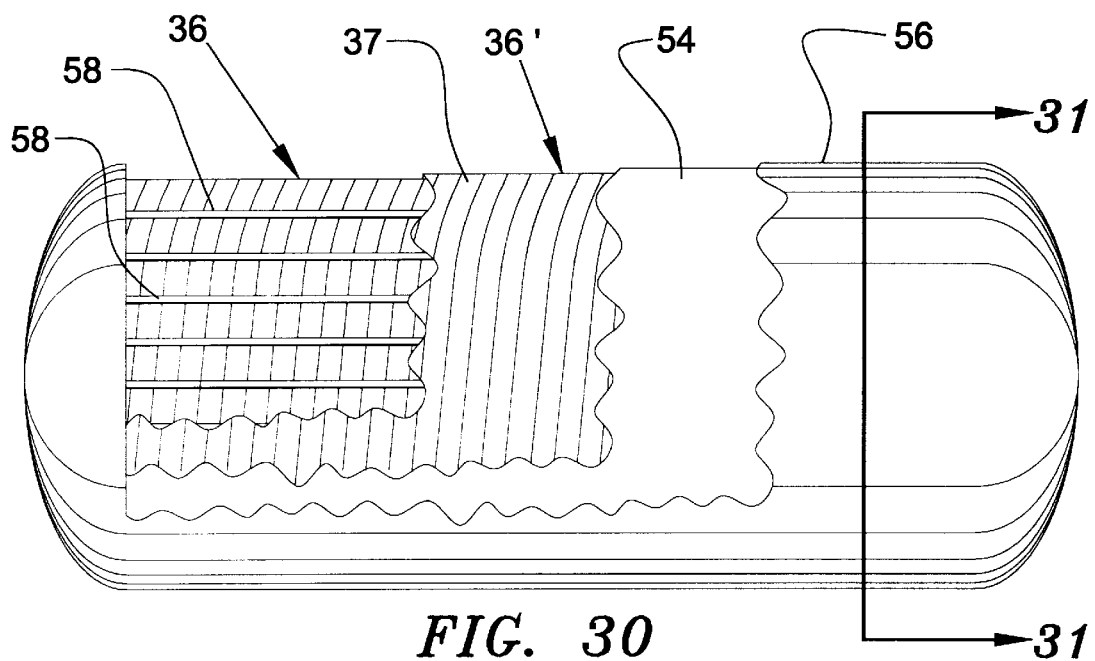
FIG. 30 is a side elevational view of a tank first portion similar to that of FIG. 27 but incorporating longitudinal stiffening members.
Figure 31:
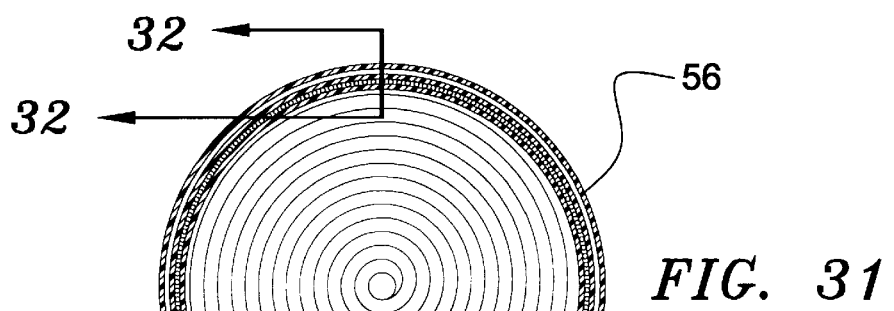
FIG. 31 is an end sectional view of the tank of FIG. 30, taken along line 31—31 of FIG. 30.
Figure 32:
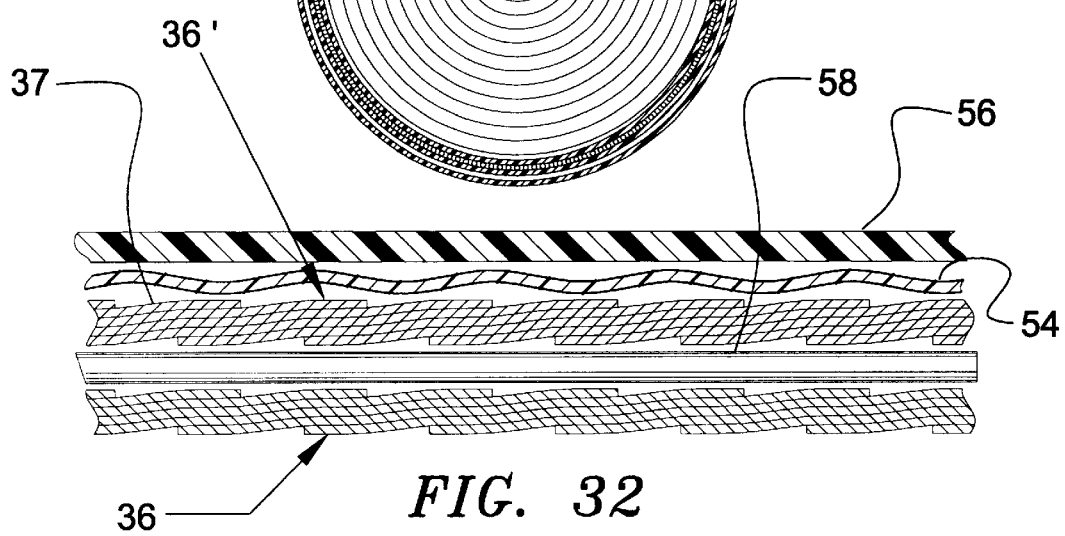
FIG. 32 is a sectional view taken along lines 32—32 of FIG. 31, and shown at an enlarged scale.

FIGS. 30 through 32 illustrate yet another embodiment of the teachings of the present invention, in which a liquid pervious reinforcing material 58, such as a plurality of rods, or suitable fibrous materials such as fiberglass, is applied over the first plurality of partially overlapping layers 36 of the extruded polymer, with a second plurality of partially overlapping layers, 36' then helically extruded over and attached to that reinforcing material 58 and the first plurality of partially overlapping layers 36, thus forming a reinforced double layer first tank portion having an outer surface 37, with at least a portion of that second plurality of overlapping layers spaced from the first. As described with respect to FIGS. 13, 14 and 17–19, such reinforcing material could also take the form of circumferential rings 33. If desired, an outer sheath 56, either of resin impregnated fibrous material, or, if desired, an additionally helically extruded layer of resin may be applied, with or without the spacing release material 54, described above.

FIGS. 33 through 35 illustrate yet another embodiment of the teachings of the present invention, in which a tank first portion fabricated generally in accordance with the illustrations of FIGS. 15 through 17 has layers of the spacing release material 54 and 54' interposed between not only the outer surface 37' of the extruded inner tank and the outer sheath 56, but also interposed between the outer surface 37 of the first layer 36 of the helically extruded overlapping strips of polymer and the second layer 36' of such helically extruded overlapping layers of the polymer material. In this manner there may be provided, effectively, a triple wall tank permitting the passage of liquids between each of those three spaced wall portions.

While the foregoing describe a variety of preferred embodiments of the fabrication procedures and the tanks resulting therefrom, it is to be understood that such description is illustrative only of the principals of this invention and is not to be considered limitative thereof. Because numerous variations and modifications of the present invention will readily occur to those skilled in the art, the scope of this invention is to be limited solely by the claims appended hereto.

What is claimed is:

1. A tank for the storage of liquids, comprising
   a first tank portion formed by helically extruding in situ a first plurality of partially overlapping layers of a synthetic resin material over a portion of a cylindrical form having a cylindrical sidewall with opposed axial ends, with each successive layer bonding to a portion of each adjacent said overlapping layer along said cylindrical sidewall;
   an end portion formed and sealingly affixed to one of said sidewall portion axial ends to form one closed end of said first tank portion;
   a second tank portion of predetermined configuration sealingly affixed to the opposed said axial end of said sidewall portion to form a substantially closed cylindrical tank.

2. The tank of claim 1 wherein said second tank portion comprises a second said end portion sealingly affixed to said opposed axial end of said sidewall portion.

3. The tank of claim 1 wherein said second tank portion is formed by extruding in situ a first plurality of partially overlapping layers of a synthetic resin material over a portion of a removable cylindrical form having a cross section dimension generally equal to the diameter of said first tank portion and having a cylindrical sidewall with opposed axial end portions, with each successive layer bonding to a portion of each adjacent said overlapping layer along said cylindrical sidewall, and forming and sealingly affixing an end portion to one of said opposed axial ends to form a first cylindrical tank portion having one substantially closed end and an opposed substantially open end, with said substantially open end being sealingly affixed to said first tank portion substantially open end, whereby is formed a substantially closed cylindrical tank.

4. The tank of claim 1 further comprising an additional thickness of synthetic resin extruded in situ as a plurality of partially overlapping layers extending over at least said first tank portion.

5. The tank of claim 4 further comprising an additional layer comprising a plurality of helically extruded, partially overlapping layers of synthetic resin extruded in situ over said first tank portion and said second tank portion, whereby is formed a thicker tank of extruded synthetic resin.

6. The tank of claim 5 further comprising a fibrous reinforcing material interposed between said first and second tank portions and said additional layer, with said reinforcing material being attached to said additional layer, whereby is provided a reinforced, double layer tank.

7. The tank of claim 5 further comprising a spacing material interposed between said first and second tank portions and at least a portion of said additional layer, whereby is provided a spaced, double wall tank with at least a portion of said first and second tank portions spaced from said additional layer to permit passage of liquids between said first and second tank portions and said additional layer.

8. The tank of claim 7 wherein said spacing material comprises an imperforate material.

9. The tank of claim 8 wherein said spacing material comprises a liquid-permeable material.

10. The tank of claim 1 further comprising
    a substantially rigid outer sheath formed of a resin-impregnated fibrous material that is substantially liquid-tight applied over said inner tank, the inner surface of said outer sheath being spaced radially outwardly from at least a substantial portion of the outer surface of said inner tank cylindrical sidewall, whereby at least a substantial portion of the inner surface of the outer sheath is spaced from the outer surface of the inner tank cylindrical sidewall to permit passage of liquids between the inner tank and the outer sheath.

11. The tank of claim 10 wherein said inner tank includes at least one ridge extruded and extending helically on said cylindrical sidewall and extending radially outwardly of the remainder of said cylindrical sidewall, with said inner surface of said outer sheath engaging said inner tank outwardly extending ridge and being spaced thereby outwardly from a substantial portion of said outer surface of said inner tank.

12. The tank of claim 11 wherein said ridge is defined by the overlapping portions of said successive layers of said extruded resin.

13. The tank of claim 10 further comprising a layer of spacing material interposed between said inner tank and said outer sheath to define an interstitial space between said inner tank and said outer sheath.

14. The tank of claim 13 wherein said spacing material comprises an imperforate material.

15. The tank of claim 14 wherein said imperforate material comprises a sheet of polyester resin.

16. The tank of claim 14 wherein said extruded synthetic resin material comprises a thermoplastic resin material.

17. The tank of claim 14 wherein said extruded synthetic resin material comprises a thermosetting resin.

18. The tank claim 14 wherein said extruded synthetic resin material comprises a cross-linked polymer.

19. The tank of claim 10 further comprising a release material interposed between at least a substantial portion of said inner tank outer surface and the inner surface of said outer sheath to prevent bonding between at least a substantial portion of said inner tank outer surface and said outer sheath to provide for passage of liquids between said inner tank and said outer sheath.

20. The tank of claim 19 wherein said release material comprises a sheet of imperforate material.

21. The tank of claim 20 wherein said imperforate material comprises a polyester resin.

\* \* \* \* \*